(12) United States Patent
Baehr-Jones et al.

(10) Patent No.: US 7,372,013 B2
(45) Date of Patent: May 13, 2008

(54) NEAR FIELD SCANNING MICROSCOPE PROBE AND METHOD FOR FABRICATING SAME

(75) Inventors: Tom Baehr-Jones, Pasadena, CA (US); Michael J. Hochberg, Pasadena, CA (US); Axel Scherer, Laguna Beach, CA (US)

(73) Assignee: California Institute of Technology, Pasadena, CA (US)

( * ) Notice: Subject to any disclaimer, the term of this patent is extended or adjusted under 35 U.S.C. 154(b) by 360 days.

(21) Appl. No.: 11/116,111

(22) Filed: Apr. 26, 2005

(65) Prior Publication Data

US 2005/0263686 A1  Dec. 1, 2005

Related U.S. Application Data

(60) Provisional application No. 60/566,139, filed on Apr. 27, 2004.

(51) Int. Cl.
*G01N 23/00* (2006.01)
(52) U.S. Cl. .................. 250/216; 977/862
(58) Field of Classification Search ........ 250/234, 250/216, 306, 307, 227.11, 227.2, 227.26; 385/31; 359/368, 894; 977/862
See application file for complete search history.

(56) References Cited

U.S. PATENT DOCUMENTS

| | | | |
|---|---|---|---|
| 4,604,520 A | 8/1986 | Pohl | 250/216 |
| 5,272,330 A * | 12/1993 | Betzig et al. | 250/216 |
| 5,389,779 A | 2/1995 | Betzig et al. | 250/216 |
| 5,410,151 A | 4/1995 | Buckland | 250/227.26 |
| 5,664,036 A | 9/1997 | Islam | 385/31 |
| 5,789,742 A * | 8/1998 | Wolff | 250/227.11 |
| 5,894,122 A | 4/1999 | Tomita | 250/234 |
| 5,914,218 A * | 6/1999 | Smith et al. | 430/320 |
| 5,960,147 A * | 9/1999 | Muramatsu et al. | 385/123 |
| 5,994,691 A | 11/1999 | Konada | 250/234 |
| 6,194,711 B1 | 2/2001 | Tomita | 250/234 |
| 6,668,628 B2 * | 12/2003 | Hantschel et al. | 73/105 |
| 6,734,425 B2 * | 5/2004 | Hantschel et al. | 250/306 |
| 6,866,255 B2 * | 3/2005 | Fork et al. | 267/37.1 |
| 6,949,732 B2 * | 9/2005 | Kiguchi et al. | 250/216 |
| 7,010,183 B2 | 3/2006 | Estes et al. | 385/14 |
| 7,015,584 B2 * | 3/2006 | Chow et al. | 257/773 |
| 7,027,689 B2 | 4/2006 | Blumberg et al. | 385/39 |
| 2002/0104959 A1 * | 8/2002 | Arsenault et al. | 250/227.11 |
| 2003/0206708 A1 * | 11/2003 | Estes et al. | 385/130 |

OTHER PUBLICATIONS

Almeida, V., et al., "Nanotaper for compact mode conversion", *Optics Letters* 28, pp. 1302-1304 (2003).
Baehr-Jones, T., et al., "A distributed implementation of the finite-difference time domain (FDTD), method", *Applied Computational Electromagnetics Society* (2001).

(Continued)

*Primary Examiner*—Jack Berman
*Assistant Examiner*—Michael Maskell
(74) *Attorney, Agent, or Firm*—Steinfl & Bruno (57) ABSTRACT

A near-field scanning microscopy probe and a method for doing the same. A metal plasmon or dielectric waveguide is connected to a deformable material and coupled to a dielectric waveguide on a chip. The probe pops up out of the plane of the chip. The probe can be easily integrated with standard on-chip optical components.

26 Claims, 6 Drawing Sheets

OTHER PUBLICATIONS

Baehr-Jones, T., et al., "High-Q ring resonators in thin silsicone-on-insulator", *Applied Physics Letters* 85 (2004).

Barnes, W.L., et al., "Surface plasmon subwavelength optics" *Nature*, vol. 424, (Aug. 14, 2003).

Henschel, W., et al., "Study of a high contrast process for hydrogen slisesquioxane as a negative tone electron beam resist", *Journal of Vacumm Science & Technology B: Microelectronics and Nanometer Structures* 21, pp. 2018-2025 (2003).

Hochberg, M., et al., *Opt. Express* 12, pp. 5481-5486 (Nov. 2004).

Maier, S. A., et al., "Local Detection of electromagnetic energy transport below the diffraction limit in metal nanoparticel plasmon waveguides", *Nature Materials* 2, pp. 229-232 (2003).

Nikolajsen, T., et al., "Poymer -based surface-plasmon-polariton stripe waveguides at telecommunication wavelengths", *Applied Physics Letters*, vol. 82, No. 5 (Feb. 3, 2003).

Rangelow, I. W., et al., "Reactive ion etching for microelectrical mechanical system fabrication", *Journal of Vacuum Science & Technology B: Microelectronics and Nanometer Structures* 13" pp. 2394-2399 (1995).

Taillaert, W., et al., "An Out of Planar Waveguided and Single-Mode Fibers", IEEE *Journal of Quantum Electronics* 38, 949 (2002).

Takahara, J., et al., "Guiding of a one-dimensional optical beam with a nano-meter diameter", *Optical Letters* 22, pp. 475-477 (1997).

Vukovic, J., et al., "Surface Plasmon enhanced light emitting diode", *IEEE Journal of Quantum Electronics* 36, pp. 1131-1144 (2000).

* cited by examiner

NEAR FIELD SCANNING MICROSCOPE PROBE AND METHOD FOR FABRICATING SAME

CROSS REFERENCE TO RELATED APPLICATIONS

This application claims the benefit of U.S. provisional Patent Application Ser. No. 60/566,139, filed Apr. 27, 2004 for "Integrated, Planar, High Resolution Near Field Scanning Optical Microscope Probes and Method for Fabricating Same" by Tom Baehr-Jones and Michael J. Hochberg, the disclosure of which is incorporated herein by reference. This application is filed on the same day of U.S. patent application Ser. No. 11/116,110 entitled "Integrated Plasmon and Dielectric Waveguides", also incorporated herein by reference in its entirety.

STATEMENT REGARDING FEDERALLY SPONSORED RESEARCH OR DEVELOPMENT

The present invention was made with support in part from a grant from the Air Force Office of Scientific Research (AFOSR contract FA9550-04-1-0413). The United States Government has certain rights in the invention.

BACKGROUND

1. Field

The present writing is directed to a Near Field Scanning Microscopy (NSOM) probe and a method for fabricating the same.

2. Related Art

According to the Near Field Scanning Microscopy (NSOM) technique, a scanning probe microscope is used to interrogate the optical near field region of various substrates. The technique typically uses a pulled or metallized fiber as an optical delivery and/ or extraction system.

There are a number of NSOM techniques, depending primarily on the illumination and interrogation path. Some techniques utilize a fiber probe as both the source and the probe by placing a filter, beamsplitter or circulator inline with the optical path. Other techniques only either illuminate or interrogate using the optical probe.

U.S. Pat. No. 4,604,520 describes an optical near-field scanning microscope. U.S. Pat. No. 5,272,330 describes a near field scanning microscope having a tapered waveguide. U.S. Pat. No. 5,389,779 describes a method and apparatus for near-field, scanning, optical microscopy by reflective, optical feedback. U.S. Pat. No. 5,410,151 describes a fiber optic probe and a method of making the same. U.S. Pat. No. 5,664,036 describes a high resolution fiber optic probe for near field and method of making same. U.S. Pat. No. 5,789,742 describes a near-field scanning optical microscope probe exhibiting resonant plasmon excitation. U.S. Pat. Nos. 5,894,122, 5,994,691 and 6,194,711 describe a scanning near field optical microscope. All those patents are incorporated herein by reference in their entirety.

NSOM probes are typically made by a process that requires each individual probe to be fabricated separately. Such process is time and cost intensive.

SUMMARY

According to a first aspect of the present disclosure, a near-field scanning microscopy probe is provided, comprising: a first waveguide portion to couple light in or out of the probe; a second waveguide portion associated with the first waveguide portion; and a deformable layer connected with the second waveguide portion, wherein deformation of the deformable layer allows bendability of the second waveguide portion, so that the second waveguide portion extends out of a plane of the first waveguide portion.

According to a second aspect of the present disclosure, a near-field scanning microscopy probe is provided, comprising: a plurality of upstream dielectric waveguides; a downstream dielectric waveguide light input portion; a downstream dielectric waveguide light output portion; and an optical switch connecting the plurality of upstream dielectric waveguides with the downstream dielectric waveguide light input portion and the downstream dielectric waveguide light output portion, the optical switch controlling the plurality of upstream dielectric waveguides.

According to a third aspect of the present disclosure, a method for fabricating a bimaterial structure is disclosed, comprising: providing an insulator layer; providing an upper layer above the insulator layer; patterning the upper layer; providing a deformable layer above the upper layer; and forming an undercut region under the upper layer to release the upper layer and the deformable layer, thus allowing the upper layer and the deformable layer to pop up.

Cantilever structures are formed by creating a bilayer of two materials deposited in sequence such that the stress or strain in the two layers is different. If one end of such structure is then released, it can be designed such that it bends up to a particular angle, defined by the stresses and the geometry of the device. The present disclosure describes a way of using such fabrication techniques to batch-fabricate NSOM probes. Light can be guided in silicon or other high index materials, so that optical devices such as directional couplers can be fabricated in these same geometries.

BRIEF DESCRIPTION OF THE DRAWINGS

The drawings are not to scale and the relative dimensions of various elements in the drawings are depicted schematically and not to scale.

DETAILED DESCRIPTION

The present application discloses a technique of growing a deformable or strained layer of dielectric on top of metal or dielectric waveguides, and then releasing the supporting material such that the structure 'pops up', thus creating a usable NSOM probe. Alternatively, a compressively stressed layer can be provided on the bottom of the waveguide.

Further, embodiments where a tensile strained layer is provided on the top of the waveguide and a compressively stressed layer is provided on the bottom of the waveguide are also possible. These layers can either be external to the waveguiding region or integral with it.

FIGS. 1-6 show an embodiment of the method for the case of SOI (silicon-on-insulator) fully etched waveguides. However, the person skilled in the art will recognize that the method can be used for a variety of other waveguide geometries as well. Further, the person skilled in the art will also understand that further optical elements, such as beamsplitters, MUXes, light sources (e.g. lasers or LED's) can be integrated onto the same chip.

Figure 1:
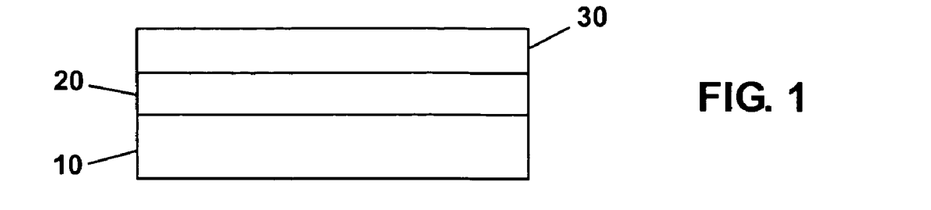
FIGS. 1-6 show steps of a method to fabricate a structure in accordance with an embodiment of the present disclosure.
Figure 2:
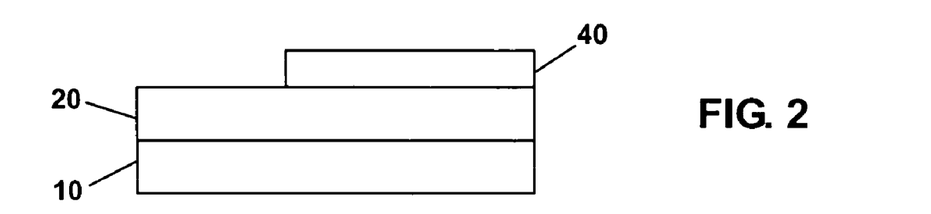
Figure 3:
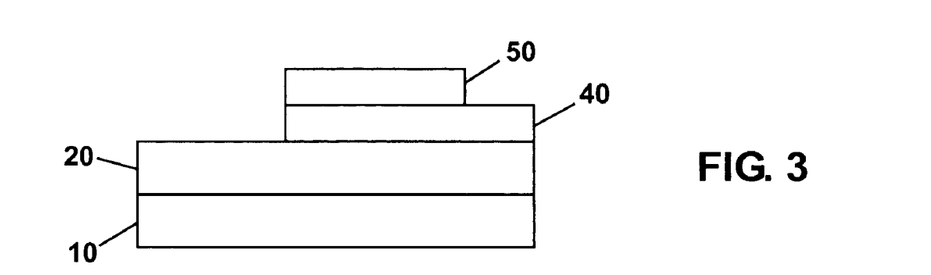
Figure 4:
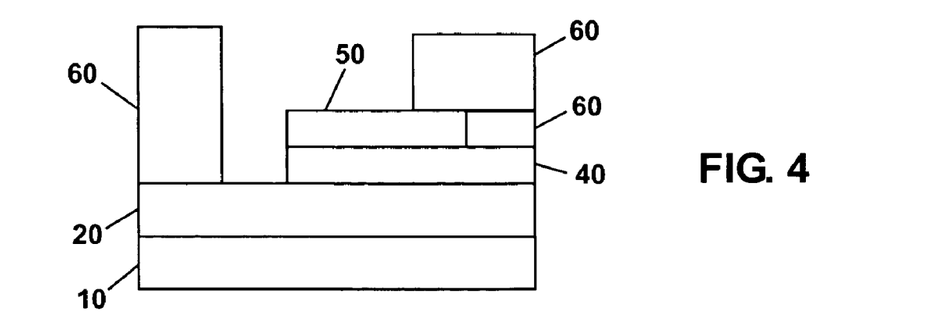
Figure 5:
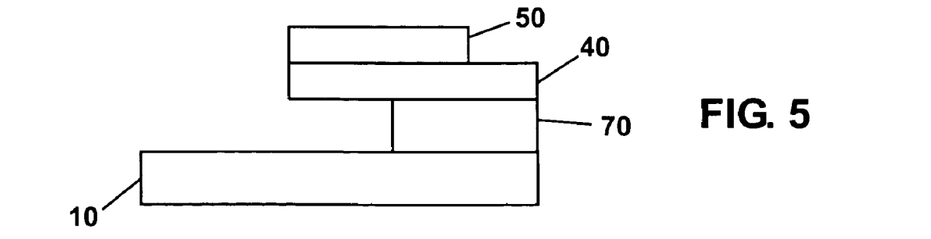

FIG. 1 shows a typical SOI structure with a silicon handle layer 10, an insulator layer 20 (e.g., oxide) and a silicon device layer 30. In a first step, lithography and etching is used to define a silicon waveguide 40, as shown in FIG. 2. In a second step, a strained layer 50 is deposed in the waveguide 40, as shown in FIG. 3. For example, the strained layer 50 is made of nitride. In a third step, an undercut region is defined, for example by means of resist layers 60, as shown in FIG. 4. FIG. 5 shows a further step, where the undercut is released, forming a structure comprising a base 70, a silicon layer 40, and a strained layer 50. The strained layer can also be made, for example, of silicon, metal, a dielectric material, or glass.

The method shown in FIGS. 1-5 has been described with respect to a strained layer formed on top of a dielectric waveguide. The person skilled in the art will understand that the above method can be used also to form a strained layer above a metal waveguide by using, for example, a bilayer of metal or metal plus dielectric. Typical deposition methods are evaporation, electroplating or sputtering.

Figure 6:
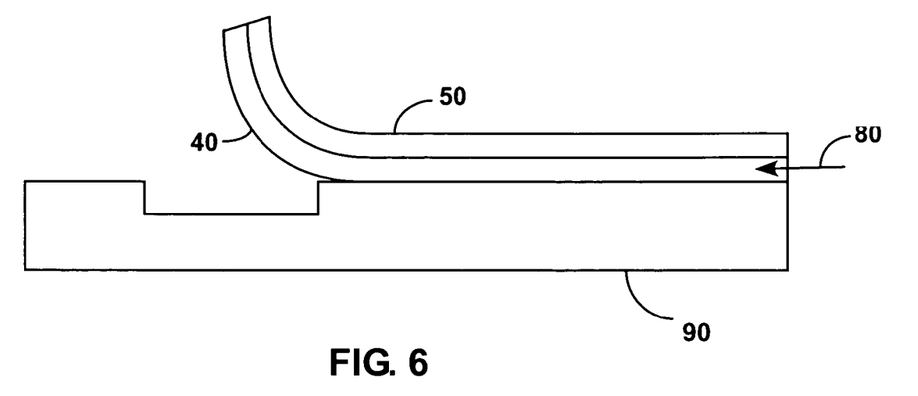

FIG. 6 shows operation of an embodiment of the structure of FIG. 5 when light is input from the waveguide in the direction of the arrow 80 and where the whole structure is located on a supporting wafer 90. A release area 100 is also shown. The deformable or strained layer or material 50 is connected with the waveguide 40. Connection along the whole extension of waveguide 40, as shown in the figure, is not required. Deformation of the deformable layer 50 allows a portion of the waveguide 40 to be bent.

The curved end shown in FIG. 6 will form the tip of the probe in accordance with the present disclosure. The person skilled in the art will understand that the length of the 'pop up' portion of FIG. 6 is shown for exemplary purposes only and that a variety of different lengths can be provided. A probe having a portion out of the plane of the chip 90 is particularly advantageous, because it allows the probe to be parallel to the plane of the measured substance or device, without forcing the remaining portion of the chip to be parallel to such plane. In this way, scanning of position in the plane of the substrate is allowed.

Throughout the present disclosure, reference will be made to the preferred embodiment of the present disclosure, where the waveguide or waveguides are allowed to bend by way of a deformable or strained layer connected with the waveguide. A further embodiment of the present disclosure, shown in FIG. 17.

Figure 7:
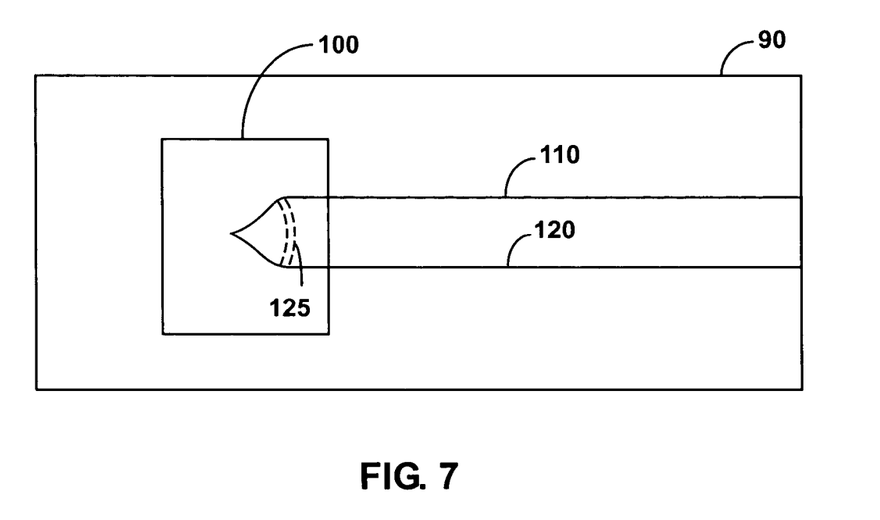
FIG. 7 shows a top view of the structure of FIG. 6, together with a light input path and a light output path.

FIG. 7 shows a top view of the structure of FIG. 6 where the waveguide comprises, for example, a light input path 110 and a light output path 120. Preferably, the structure also comprises a connecting element 125 for mechanical support, shown in broken lines. In the embodiment shown in FIG. 7, both the bendable portion of the waveguide and the waveguide portions coupling light in or out of the probe are dielectric waveguides, for example SOI waveguides. Other types of dielectric waveguides that can be used in accordance with the present disclosure include silicon waveguides, GaAs waveguides, InP waveguides, and glass waveguides.

According to the patent application filed concurrently with the present one and incorporated herein by reference in its entirety, it is possible to (a) couple light from a dielectric waveguide into a metal plasmon waveguide such that the light is confined to the edges of a thin metal slab, (b) guide light with low loss along the edges of the metal slab, and (c) couple light from a loosely confined single metal strip plasmon mode into one supported by two strips, which can confine light into extremely small volumes. A plasmon waveguide is a metal waveguide which allows conversion of the optical mode into non-radiating surface plasmons. A surface plasmon is an oscillation of free electrons that propagates along the surface of the metal.

In the following figures, additional embodiments of the present disclosure will be shown, where the bendable portion of the waveguide is made of or comprises a metal component, in particular a metal plasmon waveguide.

Figure 8:
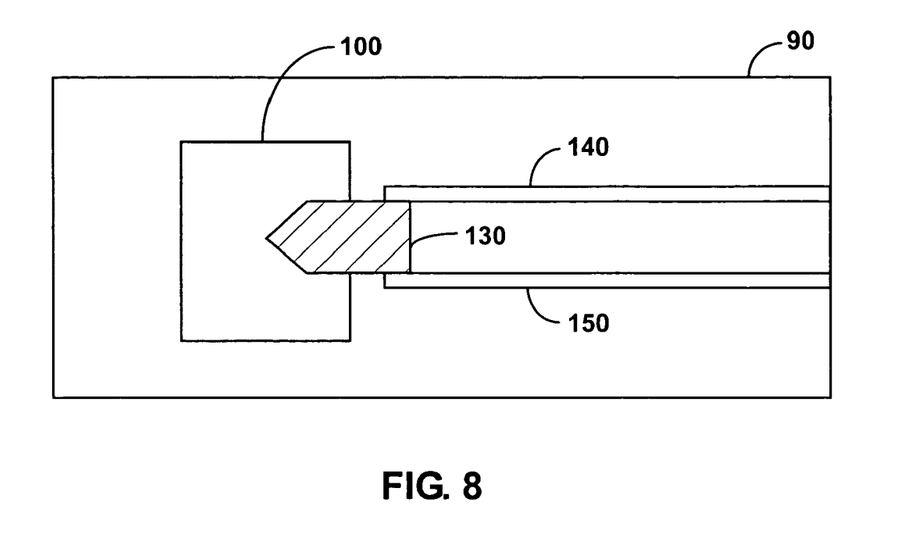
FIGS. 8 and 9 show top views of embodiments of the probe according to the present disclosure with a plasmon waveguide as the guiding layer.

FIG. 8 shows a top view of a first embodiment of the probe design with a plasmon waveguide as the guiding layer. The circuit shown in FIG. 8 has two inputs and two outputs. A metal slab 130 acting as a metal plasmon waveguide is coupled by way of directional coupling (butt coupling is also possible) with an input dielectric waveguide 140 and an output dielectric waveguide 150.

Figure 9:
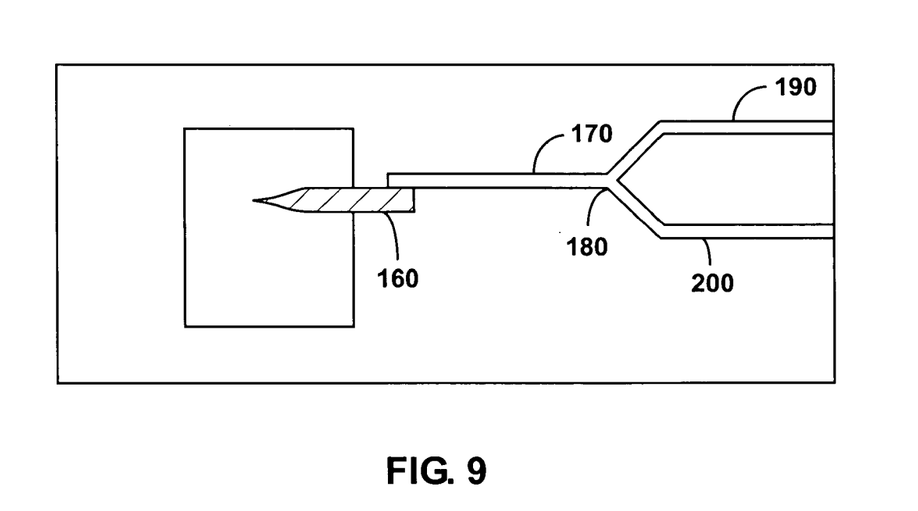

FIG. 9 shows a top view of a second embodiment of the probe design with a plasmon waveguide as the guiding layer and with a dielectric waveguide comprising a single path portion and a dual path portion. A tapered metal plasmon waveguide region 160 is coupled by way of directional coupling (butt coupling is also possible) with a dielectric waveguide 170. Therefore, the plasmon waveguide 160 has one input and one output. The waveguide 170 comprises a splitter 180 (either on-chip or off-chip) which provides for an input light path 190 and an output light path 200. A circulator can also be provided, either alternatively or in addition to the splitter. Further, an external illumination source can be provided, with the tip as a collector. Still further, the tip itself can act as an illumination source for an external collector, such as a microscope lens operating either in transmission or reflection mode. Also the embodiment shown in FIG. 8 could operate in all of the above modes, or also have input and output just on the chip.

Figure 10:
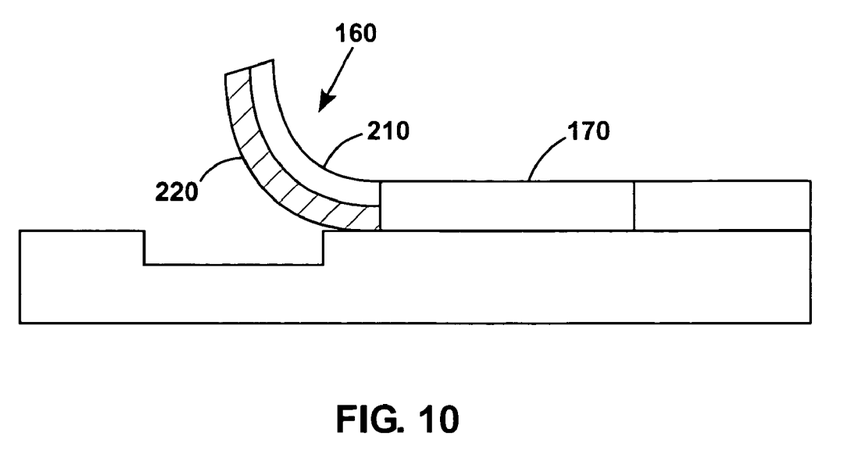
FIG. 10 shows a side view of the embodiment of FIG. 9.

FIG. 10 shows a side view of the embodiment of FIG. 9, where region 160 is in a bent condition and comprises a strained layer 210 and a metal plasmon waveguide 220 coupled with the strained layer 210.

Figure 11:
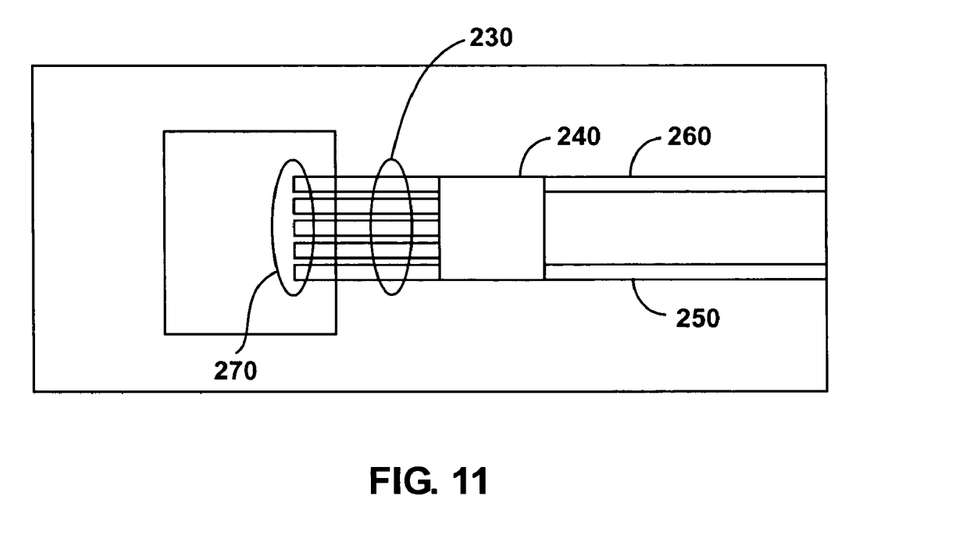
FIG. 11 shows a top view of an embodiment comprising an optical switch.

FIG. 11 shows a top view of a further embodiment of the present disclosure. A plurality of dielectric waveguides 230 is controlled by an optical switch 240. The switch 240 can be either on-chip or off-chip, and can include a beam splitter or a circulator. Also shown are an input light path 250 and an output light path 260. The tips 270 of the dielectric waveguides 230 can be either dielectric or metal tips. It the tips are metal tips, the connection between the dielectric waveguide 230 and its tip 240 can be of the type shown with reference to the previous embodiments. Each of the tips 270 can be of any of the previously described structures. Switch 240 allows light from 250 and 260 to be controllably switched between the various probes 230.

Figure 12:
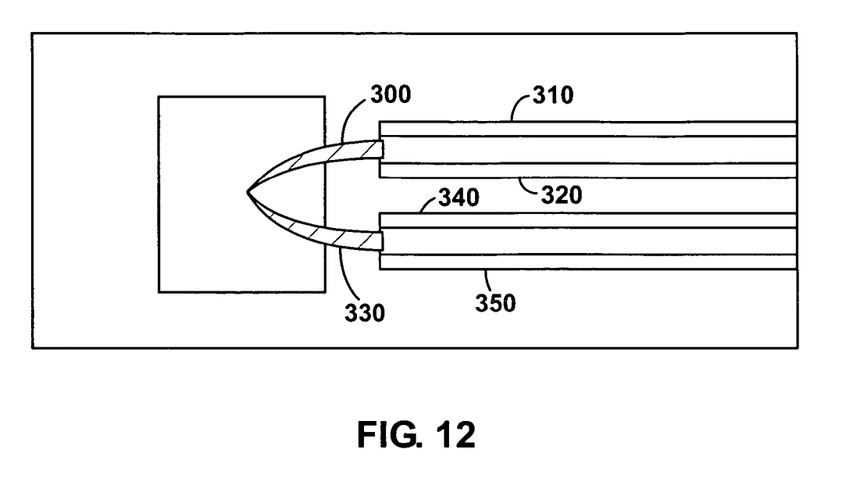
FIG. 12 shows an embodiment with a V-shaped configuration of the metal waveguide.

FIG. 12 shows a top view of another embodiment of the present disclosure. A V-shaped metal waveguide 300 is coupled to dielectric waveguides 310, 320 and metal waveguide 330 is coupled to dielectric waveguides 340, 350.

While only two metal waveguides have been shown in FIG. 12, the person skilled in the art will understand that more than two metal waveguides can be provided. In this way, a plurality of light guiding structures meeting at a point will be formed, thus allowing imaging of multiple optical modes at the same time. A mechanical connector (not shown in the figure), connecting different parts of the V-shaped waveguide can also be provided, similarly to what shown in FIG. 7. A V-shaped structure is advantageous, because it provides a better spatial resolution, and it also provides more input and output channels in the same place.

In FIG. 12, coupling between waveguide portions 300 and 310/320 or waveguide portions 330 and 340/350 is obtained by means of lateral directional coupling. Alternative kinds of coupling can be provided, such as butt-coupling, vertical directional coupling, contradirectional coupling, and coupling by adiabatic mode conversion. Butt coupling is where two waveguides are butted ends up against each other, essentially taking the inner product of the modes at the interface. Codirectional coupling and contradirectional coupling are methods that utilize evanescent waves to couple light between guides.

Figure 13:
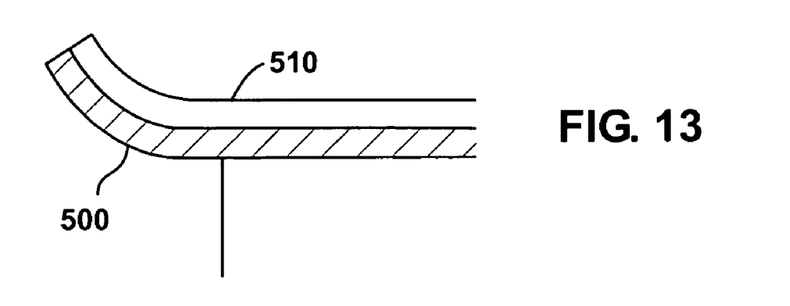
FIGS. 13-15 show possible types of tips that can be used in accordance with the present disclosure.
Figure 14:
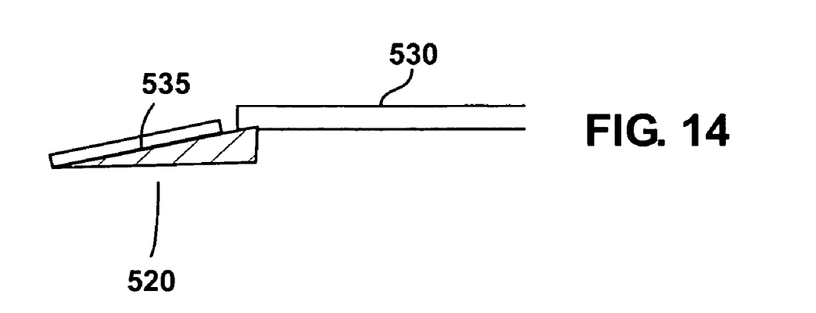
Figure 15:
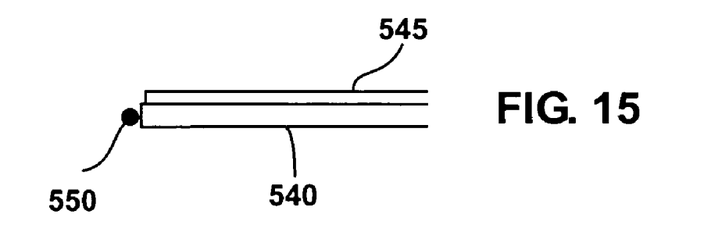

FIGS. 13-15 show possible types of tips that can be used in accordance with the present disclosure.

FIG. 13 shows a side view of a first type of tip, comprising a dielectric waveguide 500 and a strained layer 510.

FIG. 14 shows a side view of second and third types of tip, in an un-bent state, comprising a metal tip 520 and a dielectric waveguide 530, together with a strained layer 535. In the second type of tip (shown in the Figure), only the metal tip 520 bends up. In the third type of tip, also the dielectric waveguide 530 bends up, for example by locating the strained layer 535 also above the dielectric waveguide 530. Preferably, the metal tip exhibits plasmon waveguiding. The metal tip can also be lithographically defined.

FIG. 15 shows a side view of a fourth type of tip, which comprises a metal nanoparticle 540, connected to a dielectric waveguide 540, and a strained layer 545. Also in this case, the tip is shown in an un-bent state.

Figure 16:
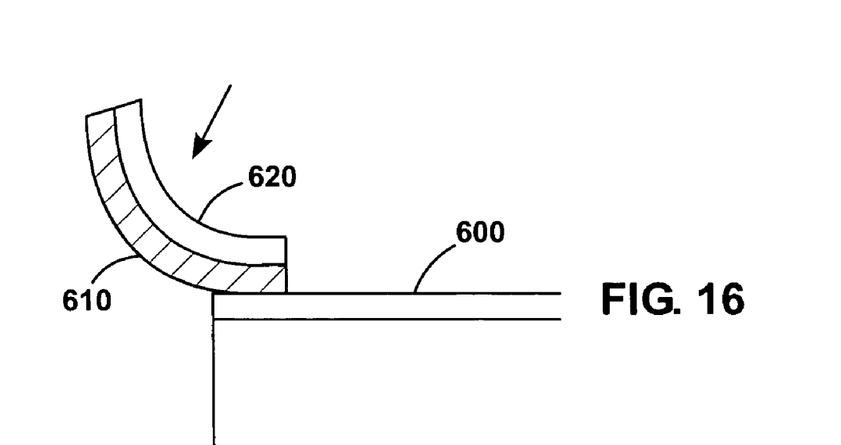
FIG. 16 shows an example of vertical directional coupling between waveguides.

FIG. 16 shows a further embodiment of the present disclosure, where coupling between the dielectric waveguide portion 600 and the metal waveguide portion 610, connected to a deformable layer 620, is obtained by way of vertical directional coupling, as shown by the fact that the waveguide portion 610 sits on the waveguide portion 600.

The present disclosure also provides for means for detecting the position of the tip, such as a metal capacitor, an external laser beam, and means for measuring the resonance frequency of the tip. An atomic force microscope (AFM) tip usually needs a means for detecting its position. For example, optical feedback from the signal can be used, by means of waveguides on chip. Alternatively, also a standard position detection method can be used.

It is worth noting that the metal layer can be coplanar with the waveguide (sitting on the oxide before the release in the SOI case) or sitting on top of the waveguide material. The metal layer can be a tensile stressed layer that causes the whole structure to bend upward, and the optical design is done such that the light is concentrated in the metal.

Figure 17:
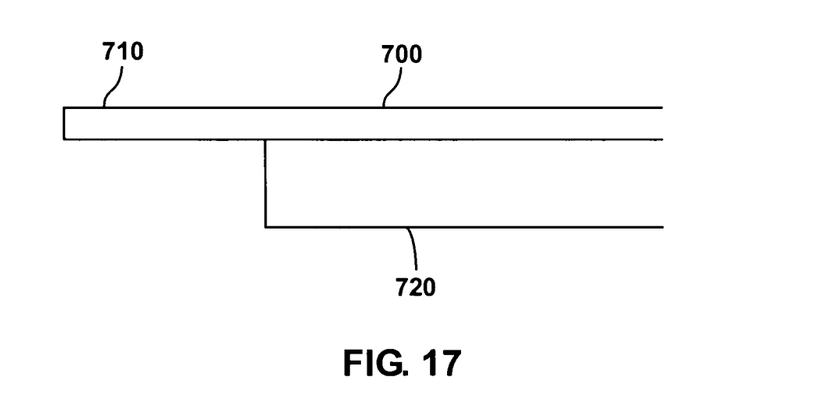
FIG. 17 shows a further embodiment of a probe in accordance with the present disclosure.

FIG. 17 shows a further embodiment of the present disclosure, where a probe 700 has a portion 710 cut out of the plane of the chip 720, and where no strained layer is provided. Cutting off the portion 710 can be performed by performing a precision cleave at the edge of the chip 720 and mount the chip 720 in a way that the portion 710 hangs off the chip 720. The person skilled in the art will understand that the edge-on configuration of FIG. 17 can be used with any of the geometries and waveguide configurations shown throughout the present disclosure.

In all of the embodiments shown in the present disclosure, the probe can be integrated on chip with one or more on-chip optical components, such as lasers, amplifiers, splitters, taps, circulators, detectors, interferometers, switches, modulators, mode converters, or polarizers, all of which are well known to the person skilled in the art. For example, the whole structure could be constructed on a GaAs or InP chip. Further, the on-chip waveguides can also incorporate gain, so that all of the on-chip components can be lasers, thus eliminating the need for an external laser.

Further, the bendable waveguide portion comprising the tip can also comprise an active photonic device such as a laser, a light emitting diode or a super light emitting diode.

In all embodiments shown in the present application, coupling between a dielectric waveguide and a plasmon waveguide is preferably obtained in a way so that light is guided along an edge of the plasmon waveguide, as disclosed in the above cited patent application filed concurrently with the present one and incorporated herein by reference in its entirety.

While several illustrative embodiments of the invention have been shown and described, numerous variations and alternative embodiments will occur to those skilled in the art. Such variations and alternative embodiments are contemplated, and can be made without departing from the scope of the invention as defined in the appended claims.

What is claimed is:

1. A near-field scanning microscopy probe comprising:
   a first waveguide portion to couple light in or out of the probe;
   a second waveguide portion associated with the first waveguide portion, wherein the second waveguide portion has a V-shaped configuration;
   a deformable layer connected with the second waveguide portion, wherein deformation of the deformable layer allows bendability of the second waveguide portion, so that the second waveguide portion extends out of a plane of the first waveguide portion; and
   a mechanical connector connecting different parts of the V-shaped second waveguide portion.

2. The probe of claim 1, wherein the deformable layer is made of nitride.

3. The probe of claim 1, wherein the first waveguide portion and the second waveguide portion are dielectric waveguides.

4. The probe of claim 3, wherein the dielectric waveguides are selected from the group consisting of: silicon waveguides, GaAs waveguides, InP waveguides, and glass waveguides.

5. The probe of claim 1, wherein the first waveguide portion is a dielectric waveguide and the second waveguide portion is a metal waveguide.

6. The probe of claim 5, wherein the metal waveguide exhibits waveguiding at the surface of the metal.

7. The probe of claim 5, wherein the metal waveguide comprises a metal slab.

8. The probe of claim 5, wherein the metal waveguide is a tapered waveguide.

9. The probe of claim 5, wherein the metal waveguide is a plasmon waveguide.

10. A near-field scanning microscopy probe comprising:
    a first waveguide portion to couple light in or out of the probe;

a second waveguide portion associated with the first waveguide portion;

a deformable layer connected with the second waveguide portion, wherein deformation of the deformable layer allows bendability of the second waveguide portion, so that the second waveguide portion extends out of a plane of the first waveguide portion, wherein the second waveguide portion comprises a single path portion, a dual path portion and a splitter separating the single path portion from the dual path portion.

11. The probe of claim 1, the probe being integrated on chip with one or more on-chip optical components, the components being selected from the group consisting of: lasers, amplifiers, splitters, taps, circulators, detectors, interferometers, switches, modulators, mode converters and polarizers.

12. The probe of claim 1, wherein the second waveguide portion comprises an active photonic device.

13. The probe of claim 12, wherein the active photonic device is chosen from the group consisting of a laser, a light emitting diode, or a super light emitting diode.

14. The probe of claim 1, wherein the second waveguide portion comprises a metal tip exhibiting plasmon waveguiding.

15. The probe of claim 14, wherein the metal tip is a tapered metal tip.

16. A near-field scanning microscopy probe comprising:
a first waveguide portion to couple light in or out of the probe;
a second waveguide portion associated with the first waveguide portion, wherein the second waveguide portion comprises a metal tip exhibiting plasmon waveguiding and wherein the metal tip is confined between two metal waveguide portions defining a V-shaped configuration; and
a deformable layer connected with the second waveguide portion, wherein deformation of the deformable layer allows bendability of the second waveguide portion, so that the second waveguide portion extends out of a plane of the first waveguide portion.

17. The probe of claim 14, wherein the metal tip is a lithographically defined metal tip.

18. A near-field scanning microscopy probe comprising:
a first waveguide portion to couple light in or out of the probe;
a second waveguide portion associated with the first waveguide portion, wherein the second waveguide portion comprises a metal tip exhibiting plasmon waveguiding and wherein the metal tip is a nanoparticle metal tip; and
a deformable layer connected with the second waveguide portion, wherein deformation of the deformable layer allows bendability of the second waveguide portion, so that the second waveguide portion extends out of a plane of the first waveguide portion.

19. The probe of claim 1, wherein the second waveguide portion comprises a tip region.

20. The probe of claim 19, wherein the tip region comprises a plurality of metal or dielectric light guiding structures.

21. The probe of claim 20, wherein the light guiding structures meet at a point at the end of the second waveguide portion, thus allowing imaging of multiple optical modes at the same time.

22. The probe of claim 1, wherein the first waveguide portion is coupled with the second waveguide portion by way of a coupling selected from the group consisting of butt-coupling, lateral directional coupling, vertical directional coupling, contradirectional coupling, and coupling by adiabatic mode conversion.

23. The probe of claim 19, wherein the tip region comprises a light generating structure.

24. The probe of claim 23, wherein the light generating structure is a laser structure.

25. The probe of claim 19, further comprising detecting means to detect a position of the tip.

26. The probe of claim 25, wherein the detecting means is selected from the group consisting of a capacitor, an external laser beam, and means for measuring the resonance frequency of the tip.

* * * * *